Oct. 11, 1955     S. S. D. JONES     2,720,588
RADIO ANTENNAE

Filed July 7, 1950     3 Sheets-Sheet 1

S. S. D. JONES
Inventor

By Moore and Hall
Attorneys

Oct. 11, 1955 S. S. D. JONES 2,720,588
RADIO ANTENNAE
Filed July 7, 1950 3 Sheets-Sheet 2

S. S. D. JONES
Inventor
By Moore and Hall
Attorneys

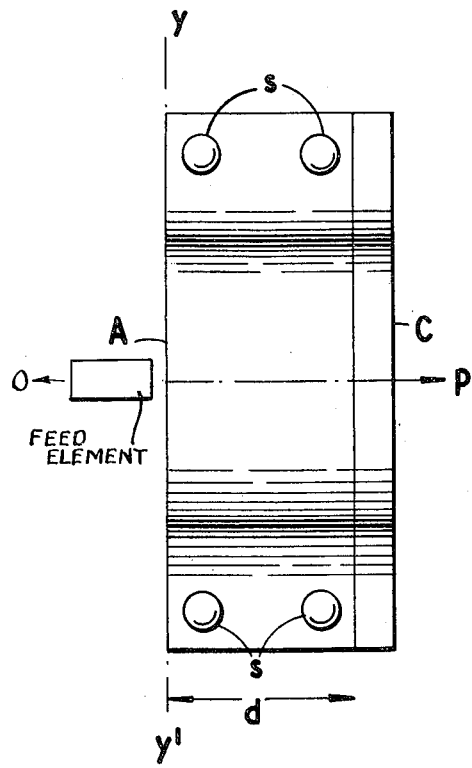
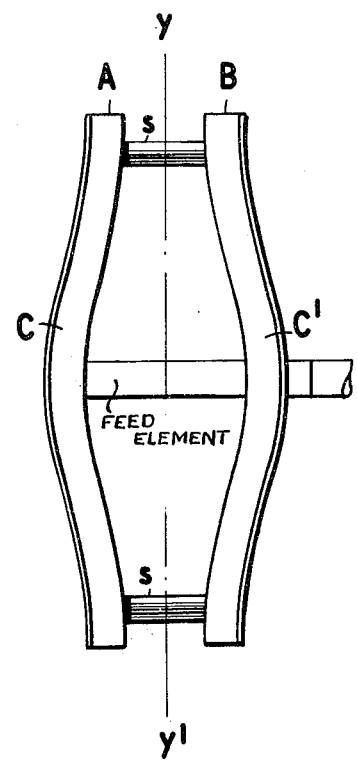
Fig. 6  Fig. 7
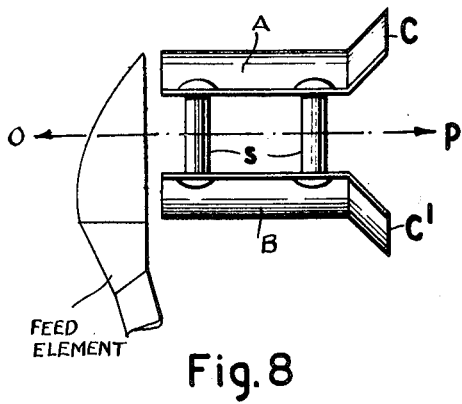
Fig. 8

2,720,588

RADIO ANTENNAE

Spencer Selth Duniam Jones, Malvern, England, assignor to National Research Development Corporation, London, England, a British corporation Application July 7, 1950, Serial No. 172,421

Claims priority, application Great Britain July 22, 1949

12 Claims. (Cl. 250—33.63)

The present invention relates to directive antennae for radio communication, radar and like systems.

It is known that the region lying between a pair of parallel conducting sheets suitably spaced apart in the direction of the H-vector of an incident radio wave will support and propagate the wave through the region. The "index of refraction" of the propagating region between the plates, may in this case, be defined as $$\mu = \frac{V}{Vg}$$

where V is the velocity of propagation of radio waves in free space, and Vg the phase velocity of propagation of radio waves in the region between the parallel plates.

For a given pair of plates spaced apart by a distance $a$, and a radio wavelength of $\lambda$, it can readily be shown that:

$$\mu = \sqrt{1 - \left(\frac{\lambda}{2a}\right)^2} \quad (1)$$

It will be appreciated that, by suitably varying the spacing between the plates in such an arrangement, the index of refraction of the region enclosed between the plates may be made to vary, within a given area, in accordance with any given law.

The present invention is based on this fact and according to the invention in one aspect there is provided a radio antenna system comprising a pair of conductive surfaces arranged in spaced relationship to define between them a region having, for radio waves of a given wavelength, a refractive index (as herein defined) varying over said region in accordance with a given law such that radiations launched into said region at a given part of its boundary will emerge from said region in a desired pattern of radiation, the part of the boundary of said region passed through by the emergent radiation being so arranged that the emergent radiation pattern is not substantially distorted from that set up by said region in passing through said boundary.

Optically it has been shown that a plane wave illuminating a transparent sphere in which the refractive index varies as the radial distance from the centre according to a certain function will be brought to a focus at a point in the surface of the sphere. The focal point will obviously lie on a diameter normal to the plane of the wave. Similarly if the sphere is replaced by a cylinder a plane wave will be brought to a line focus on the surface of the cylinder. The phenomenon is, obviously, reversible so that a line source on the surface of such a cylinder or sphere would set-up a parallel emergent beam. The function connecting the refractive index with radial distance from the centre is given by:

$$\mu = \sqrt{2 - \left(\frac{r}{R}\right)^2} \quad (2)$$

When:

$\mu$ = refractive index.
$r$ = radial distance from centre.
$R$ = Radius of sphere or cylinder.

For this relation to apply, the sphere or cylinder must be embedded in an infinite homogeneous medium of refractive index unity, and the refractive index in the sphere or cylinder must vary between the values 1 and 2. A more general relation is:

$$\frac{\mu}{\mu_0} = \sqrt{2 - \left(\frac{r}{R}\right)^2} \quad (3)$$

where $\mu_0$ = refractive index of surrounding medium.

It follows that by suitable variation in spacing between a pair of conductive surfaces, a region can be defined between them in which the refractive index varies in accordance with the law $$\mu = \sqrt{2 \left(\frac{r}{R}\right)^2}$$

Since, however, the refractive index, as given by Equation 1 above, is always less than unity, for such a structure to operate as a lens, equivalent to the sphere or cylinder discussed above in the optical case, Equation 3 must be applied and the lens surrounded by a region or medium of refractive index $$\mu = \frac{\mu_0}{\sqrt{2}}$$

where $\mu_c$ is the refractive index at the centre of the area over which the law $$\mu = \sqrt{2 - \left(\frac{r}{R}\right)^2}$$

applies.

The above considerations are applied to the production of one form of antenna according to this invention.

According to this aspect of the present invention therefore, a radio antenna system is provided comprising a pair of conductive surfaces arranged in spaced relationship to define between them a circular region having a refractive index $\mu$, (as herein defined) for radiations of a given wavelength, varying over said region in accordance with the law $$\mu = \sqrt{2 - \left(\frac{r}{R}\right)^2}$$

where $r$ is the radial distance from the centre of said region and R is the radius of said region, a feed element associated with a point on the boundary of said region, said region being bounded over at least a part thereof opposite the point at which said feed element is located by extensions of said conductive surfaces defining between them a further, boundary region having a refractive index $\mu_0$ for radiations of said given wavelength such that $$\mu_0 = \frac{\mu_c}{\sqrt{2}}$$

where $\mu_c$ is the value of $\mu$ at the centre of said circular region. With such an arrangement the feed element may be arranged so as to be movable around a part of the circumference of the circular region so that the direction of maximum sensitivity of the antenna may be varied through a given angle, the boundary region being arranged to embrace at least the arc over which an emergent or incident beam will travel from or to the feed element.

The boundary region preferably terminates in a straight edge so that distortion effects due to the emergence (or incidence) of a beam between this region and free space will be minimised.

The variation of index of refraction over the circular region may be achieved by suitable distortion of one or both of the conductive surfaces to produce the variation in spacing between these surfaces appropriate to the desired variation in index of refraction.

It has further been shown that if a transparent body is provided in the form of a semi-cylinder, that is a cylinder divided at a diameter, and the index of refraction of the body varies, from the axis of generation of the cylinder radially towards the curved surface, according to the law $$\mu_r = \frac{\mu_0}{1+\left(\frac{r}{R}\right)^2} \quad (4)$$

where $\mu_r$ is the index of refraction at a radial distance $r$ from the axis of generation of the cylinder, $\mu_0$ is the index of refraction at the axis and $R$ is the radius of the cylinder, a plane wave incident on the plane diametrical surface will be brought to a focus in a line on the curved surface of the cylinder opposite the diametrical plane face.

This theory may also be applied to an antenna embodying this invention.

In order that the invention may be more clearly understood and readily carried into effect some embodiments thereof will now be described with reference to the accompanying drawings in which:—

Fig. 6 is a plan view of a further antenna according to the invention.

Fig. 7 is a side elevation, and

Fig. 8 is an end elevation of thhe antenna.

Figure 1:
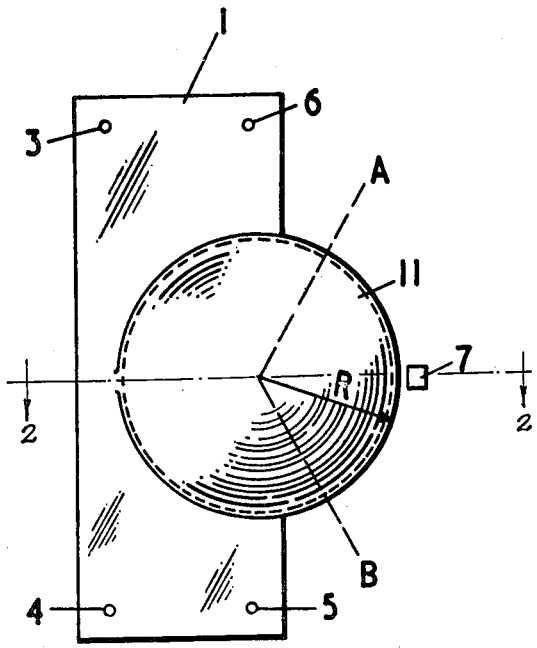
Fig. 1 is a plan view.
Figure 2:
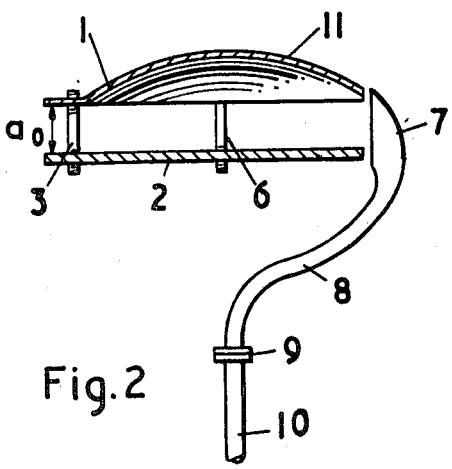
Fig. 2 is a side elevation of an antenna construction taken on line 2—2 of Figure 1.

The antenna shown in the drawings comprises a pair of metal sheets 1 and 2 supported in spaced relationship by spacing members 3, 4, 5 and 6. A feed element in this case the open end of a waveguide 7, is arranged to launch a wave into (or receive energy from) the space between the plates 1 and 2, the waveguide 7 extending downwardly below the structure to a rotating joint 9 located below the centre point of the circular lens portion of the structure, to be described below, through which the waveguide 7 is coupled to a further waveguide 10 which leads to the transmitter or receiver (not shown) with which the antenna is to be used. It will thus be seen that the feed element, i. e. the open end of the waveguide 7, may be swung to any point on the periphery of the circular lens portion, over an arc A—B.

The lower sheet 2 is a plane sheet. The upper sheet 1 is formed with a bulge 11, concave side downwards, the shape of which, in plan, is circular as seen in Fig. 1, and which forms the circular lens portion referred to above. The vertical shape of this bulge is a curve the formula for which is given below.

The spacing between the plates 1 and 2, outside the area of the bulge 11 is chosen in relation to the wavelength at which the device is to operate, so that the separation $a_0$ between the plates is greater than $\lambda/2$, and less than $\lambda$, $\lambda$ being the operative wavelength. This condition is necessary to ensure a unique value for $\mu_0$ and for for this value to be real. Equation 1 above, now applies so that the refractive index in the region outside the bulge 11, but within the region between plates 1 and 2, $$\mu_0 = \sqrt{1-\left(\frac{\lambda}{2a_0}\right)^2}$$

Within the bulge 11 the refractive index $$\mu = \sqrt{2-\left(\frac{r}{R}\right)^2}$$

It follows from these relations and Equation 3 above that the separation $a$ of the plates at any point within the bulge may be calculated from the equation:

$$a = \frac{\lambda}{2\sqrt{1-\mu_0^2\left(2-\left(\frac{r}{R}\right)^2\right)}}$$

where $r$ is the radial distance of the given point from the centre of the bulge and $R$ the radius of the bulge (seen in plan).

The feed element 7, which may be a horn, dipole, resonant slot or any like structure, is arranged to act as a line source to launch into the space between the sheets 1 and 2, in all directions, a wave in the H mode for which the sheet spacing is appropriate. This wave, in passing through the bulge region will be focussed into a plane fronted wave which will traverse the portion of the structure over which the sheets 1 and 2 are parallel and, emerging from the straight opposite edge will suffer some refraction but will remain a plane fronted wave. The direction of the emergent beam will depend upon the position of feed element 7. The extent of the arc A—B (Fig. 1) over which the feed element 7 may be moved while still giving a plane fronted emergent wave will depend upon the extent of the parallel portion of the sheets 1 and 2, that is the length of the straight front edge of the structure.

Satisfactory working over an angle of 50° can readily be achieved, and greater angles can be arranged for by suitably extending the structure. Backward radiation outside the structure is preferably minimised or prevented by suitable design of the feed element 7.

The structure of the device according to the invention may take various forms. Thus, for example, the upper sheet 1 with the bulge 11 may be formed from metal sheeting as described, or the appropriate profile may be applied to one surface of an insulating slab which is then rendered conductive by spraying or otherwise applying metal to it. Equally, it is possible to bulge both of the sheets 1 and 2, to produce the proper variation in spacing. Further, bulging of sheets 1 and 2 may be avoided altogether by introducing dielectric material suitably profiled into the space between plane conductive sheets to provide the proper variation of refractive index in the space between them.

Any suitable provision may be made for moving the feed element 7 around the edge of the bulge portion 11. Thus, instead of a physically movable feed device as shown it is also possible to provide a plurality of fixed feed elements distributed around the appropriate arc, a switching mechanism being provided to render these elements operative selectively at the appropriate times.

Figure 3:
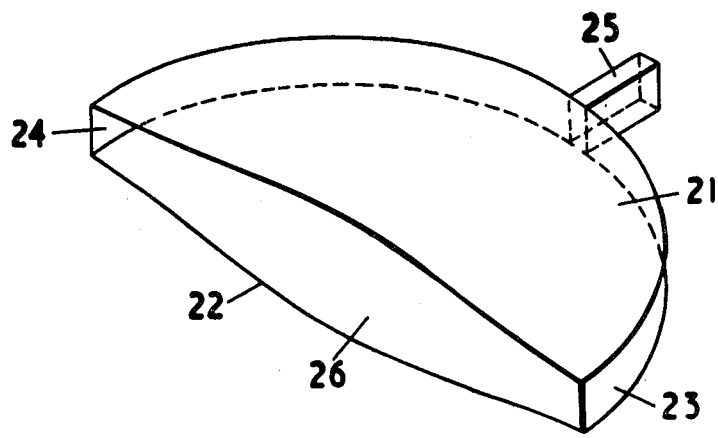
Fig. 3 is a perspective view of an antenna constructed according to the invention.

Referring now to the arrangements shown in Fig. 3, this figure shows an antenna comprising a pair of conducting sheets 21 and 22 supported in spaced relationship by means of curved side plates 23 and 24. The conducting sheets 21 and 22 each have a periphery in the form of a semi-circle. A wave guide 25 is positioned on the bisector of the diameter of the semi-circles which forms the aperture 26 of the antenna. The waveguide 25 is arranged to launch radio waves in thhe $H_1$ mode into (or receive energy from) the space between the sheets 21 and 22.

The spacing between the sheets 21 and 22 around the edges bounded by the curved plates 23 and 24 is greater than $$\frac{\lambda}{2}$$

and less than $\lambda$, $\lambda$ being the operative wavelength.

The sheets 21 and 22 are identically profiled in such a manner and are spaced apart by such a distance that the distance $a$ between the sheets at any point obeys the following equation, obtained by combining Equations 1 and 4 above, viz.

$$a = \frac{\lambda}{2} \cdot \frac{1 + \left(\frac{r}{R}\right)^2}{\sqrt{\left[1 + \left(\frac{r}{R}\right)^2\right]^2 - \mu_0^2}} \quad (5)$$

For Equation 1 to be real, it is apparent that $a$ must at all times be greater than $$\frac{\lambda}{2}$$

Also, in order to suppress waves in the $H_2$ mode it is desirable that $a$ be less than $\lambda$, and hence when $r=0$ it is preferably arranged that $a$ be slightly less than, or equal to $\lambda$. This value of $a$ will then determine the index of refraction $\mu_0$ at the centre of the aperture 26.

Radio waves launched in the $H_1$ mode from the waveguide 25 then arrive in phase at the aperture 26 and a substantially parallel beam results. It is found that the "illumination" of the aperture 26 is such that any "side lobes" of radiation produced are negligible.

Figure 4:
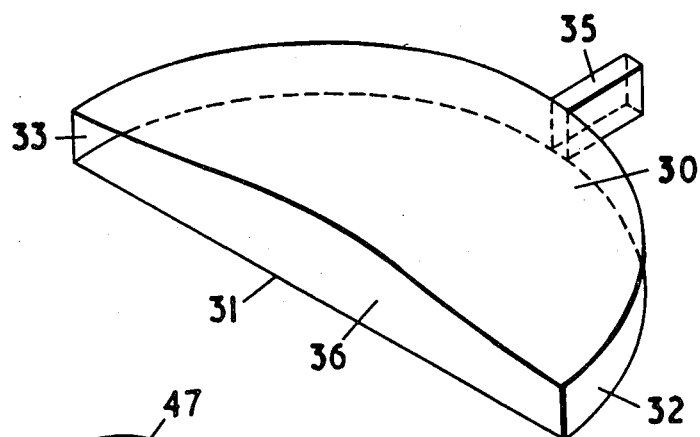
Fig. 4 is a perspective view of another embodiment of the invention.

Fig. 4 shows an antenna comprising two conducting sheets 30 and 31 having two side plates 32 and 33. The antenna is fed by a waveguide 35. The components of the antenna are arranged in a similar manner to those in the embodiments of Fig. 3 to form an aperture 36. However, only the conducting sheet 30 is profiled whilst sheet 31 is plane. The profiling of sheet 30 is such that the distance between the sheets 30 and 31 conforms to the same considerations as those given with reference to the spacing of the plates 21 and 22 of Fig. 3.

Figure 5:
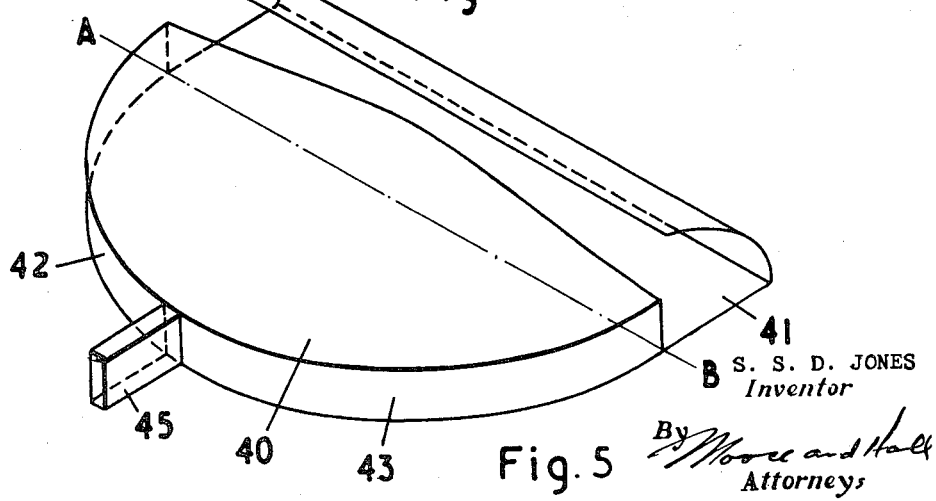
Fig. 5 is a perspective view of a further antenna system constructed in accordance with the invention.

Fig. 5 shows an antenna designed to provide a fan-shaped radiation pattern, that is, the radiation pattern is narrow in the one plane, in the aspect shown, the horizontal plane, and broad in the other plane, in the aspect shown, the vertical plane. The antenna comprises two conducting sheets 40 and 41 supported in spaced relationship by means of curved side plates 42 and 43. A waveguide 45 feeds the space between the sheets 40 and 41 in the same manner as described with reference to the waveguide 45 of Fig. 4. The dimensioning and spacing of the sheets 40 and 41 is the same as for the sheets of identical reference to Fig. 4, except that the plane sheet 41 is extended beyond the side plates 42 and 43, i. e. beyond the line AB, in the form of a rectangle and supports at its edge a parabolic cylinder 47.

The focus of the parabolic cylinder 47 lies in the line AB. The rectangular extension of the sheet 41 causes the direction of maximum radiation from the aperture of the plates 40 and 41 to be inclined towards the vertical in the aspect shown thereby directing the radiation that reflections from the parabolic cylinder 47 do not return into the aperture. The resultant reflection from the parabolic cylinder is a radiation beam which has a wide angle in the vertical plane.

It should be remembered that the Equation 4 is only one of a large number of solutions to the problem of varying refractive index radially within a semicircle or hemisphere to produce focussing of a parallel beam at a point on the circumference or vice versa.

Referring now to Figs. 6, 7 and 8 the antenna here shown comprises a pair of metallic sheets A and B mounted one above the other in spaced relationship. As will be seen from the side elevation of Fig. 7, the plates are curved in the dimension $yy'$ so as to impose a variation in the spacing between the sheets which is symmetrical about the axis $op$. This variation is such that the index of refraction of the wave propagating region formed by the space between the plates follows the law:

$$\mu(y) = \frac{\mu_0}{\cosh \frac{\pi y}{2d}} \quad (6)$$

where:

$\mu(y)$ is the refractive index at distance $y$ from the lens axis in the $(y)$ dimension, $\mu_0$ is the refractive index at the lens axis, and $d$ is the "thickness" of the lens in the direction of its axis, and is uniform, at any given distance from the axis of the lens, in the direction of the axis of the lens.

It follows from Equations 1 and 6 that the spacing between the sheets varies according to the law:

$$a = \frac{\lambda}{2} \cdot \frac{\cosh \frac{\pi y}{2d}}{\sqrt{\cosh^2 \frac{\pi y}{2d} - \mu_0^2}}$$

As before $d$ is the thickness of the lens in the direction $op$, as indicated in Fig. 6.

As will be seen from Fig. 8 the plates are straight in the dimension $op$, so that there is no variation in the index of refraction in this direction.

It can be shown that with this arrangement, dimensioned as above, a feed element located at the point $o$ to radiate energy of the appropriate wave-length into the antenna lens structure will give rise to an emergent beam in the direction $op$ which is focussed into a narrow, substantially parallel beam in the plane $yop$.

In the plane perpendicular thereto the polar diagram of the array will be of well-known fan shape as obtained with conventional so-called "cheese" mirrors. The sharpness with which the beam is focussed in the plane of the sheets and the amplitude of the side lobes which are set-up, will depend in the arrangement shown on the extent of the antenna sheets in the dimension $yy'$ and in fact the side lobes can be reduced to almost any acceptable amplitude by sufficient extension of the sheets in this dimension. In practice it has been found that side lobes can be maintained within the limits normally obtained with conventional "cheese" type mirrors with an overall length in the dimension $yy'$ of the same order as that employed in "cheese" type mirrors.

The sheets may be supported in spaced relation in any desired way, for example, as shown in the drawing by means of supporting pillars S. These supporting pillars may be of conductive material, or of dielectric material. In any case it is preferred to position these supports as far as possible away from the axis $op$ of the lens. One possible form of construction which facilitates assembly of the device within the mechanical tolerances required for the spacing between the sheets, is to provide a block at each end of the sheets to the opposite faces of which the sheets are attached. This is a particularly valuable method since the dimensions are most critical at these outer ends.

Variations in the structure are possible. For example in place of self-supporting metallic sheets which have been assumed for the structure above described, the surfaces forming the antenna may be metallic surfaces formed by spraying or plating on suitably profiled and spaced blocks of insulating material, or may be built up on suitable supporting frameworks. Furthermore, in place of the symmetrical arrangement of curved sheets shown in the example it is possible to carry out the invention using one curved and one plane sheet, the curvature applied to the curved sheet being suitably modified to produce the desired variation in the refractive index.

As shown in the drawing, the emergent boundary of the lens may be provided with a flared portion C, C' to produce the desired matching into free space and hence ensure that the polar diagram in the sense perpendicular to the plane of the lens is of the desired form.

The antenna or lens may be fed by any suitable type of feed element such as a horn or dipole with reflector located at point $o$.

It will be appreciated, that although in some instances in the above description the antenna have been described, for clarity's sake, as though they were transmitting antennae, they can equally well be used as a directional receiving antennae.

I claim:

1. Radio antenna comprising a pair of conductive sheets spaced apart to define between them a wave propagating region, the spacing between said sheets being non-uniform, the variation in spacing extending two-dimensionally from point to point according to a law related to a given law of variation in the refractive index of the wave propagating region such that said region contains at least one focal point and radiations having their E vector parallel to said conductive sheets launched into said region at the said focal point will emerge from said region in a desired pattern of radiation.

2. Radio antenna comprising a pair of conductive sheets spaced apart to define between them a wave propagating medium for radio waves of a given wavelength, the spacing between the sheets varying two-dimensionally from point to point within a lens region according to a law related to the refractive index of the wave propagating medium formed by said sheets such that said region contains at least one focal point and radiations having their E vector parallel to said conductive sheets launched in said region from the said focal point will emerge from said region in a given pattern of radiation, said region being contiguous with a boundary region within which the spacing between said sheets is uniform, whereby propagation of radiations through said boundary region from said lens region will be substantially undisturbed from the desired pattern set up in said lens region.

3. Radio antenna as claimed in claim 2 wherein said boundary region defines a contoured edge at its termination in space, the said edge being so contoured that the emergent radiation pattern will be substantially undisturbed from that set up by said lens region.

4. Radio antenna comprising a paid of conductive sheets supported in spaced relationship, the spacing being varied from point to point so that the sheets define between them a wave propagating medium having a circular region of refractive index $\mu$ (for radiations of a given wavelength) varying over said circular region in accordance with the law $$\mu = \sqrt{2 - \left(\frac{r}{R}\right)^2}$$

where $r$ is the radial distance from the centre of said region, and R is the radius of said region, a feed element adapted to launch radiations into said region with their E vector parallel to said sheets associated with a point on the perimeter of said region, said region being contiguous over at least a part of its perimeter diametrically opposite the point at which said feed element is located with a boundary region of said wave propagating medium said boundary region having a refractive index $\mu_0$ (for radiations of said given wavelength) such that $$\mu_0 = \frac{\mu_c}{\sqrt{2}}$$

where $\mu_c$ is the value of $\mu$ as the centre of said circular region.

5. Radio antenna as claimed in claim 4 wherein said boundary region embraces at least one half of the perimeter of said circular region and terminates in a straight edge substantially perpendicular to the diameter of said circular region upon which said feed element lies.

6. Radio antenna as claimed in claim 5 in which said feed element is movable mounted with respect to the antenna structure being movable through an arc extending round part of the periphery of said circular region whereby the directivity pattern of the antenna may be swung through an angle corresponding to said arc by movement of said feed element.

7. A radio antenna comprising a pair of semi-circular conductive surfaces arranged face-to-face in spaced relationship, the spacing between the surfaces varying from point to point, said surfaces defining between them a semi-cylindrical wave propagating region the refractive index of which, for radiations of a given wavelength, varies from point to point in accordance with the law $$\mu = \frac{\mu_0}{1 + \left(\frac{r}{R}\right)^2}$$

where $\mu$ is the refractive index at a point, $r$ is the radial distance of said point from the axis of the semi-cylinder, R is the radius of the semi-cylinder and $\mu_0$ is the refractive index at the axis of the semi-cylinder, and a feed element adapted to launch radiations having their E vector parallel to the said semiconductive surfaces and associated with the semi-cylindrical boundary, said feed element being located on the radius perpendicular to the straight (diametrical) boundary of said semi-cylindrical region.

8. A radio antenna comprising a pair of semi-circular conductive surfaces arranged face-to-face in spaced relationship, a semi-cylindrical conductive wall connecting together the semicircular edges of said surfaces, and a feed element adapted to launch radiations having their E vector substantially parallel to the said conductive surfaces, said feed element being associated with said semi-cylindrical wall substantially at its center, the spacing between the said semicircular surfaces varying two-dimensionally from point to point according to a predetermined law such that the region enclosed between the surfaces contains a focal point at the center of the said semi-cylindrical wall, whereby radiations entering the said region from said feed element emerge from the opposite boundary of said region in a predetermined pattern.

9. A radio antenna as claimed in claim 8 in which one of said semi-circular surfaces is plane and the other of said semi-circular surfaces is bulged in the direction away from said plane surface whereby the spacing between the surfaces varies from point to point in accordance with said predetermined law.

10. A radio antenna comprising a pair of conductive surfaces mounted face-to-face in spaced relationship the spacing between said surfaces varying from point to point to provide a variation in the refractive index of the wave propagating region formed between said surfaces in one direction across said medium according to the law $$\mu = \frac{\mu_0}{\cosh \frac{\pi y}{2d}}$$

where $\mu$ is the refractive index at any given point, $\mu_0$ is the refractive index at the axis of the structure, $y$ is the distance of said given point from said axis and $d$ is the extent of said surfaces in the direction of said axis, the spacing between said sheets at any given distance from said axis being uniform in the direction parallel to said axis and the said region containing a focal point at its boundary on the axis, and a feed element adapted to launch radiations having their E vector substantially parallel to the said surfaces, said feed element being associated with said structure and located on said axis.

11. Radio antenna as claimed in claim 10 in which said surfaces, on the side thereof opposite said feed element extend into a boundary region in which said surfaces are divergent from one another in the direction away from said feed element.

12. Radio antenna as claimed in claim 4, wherein said feed element is movably mounted with respect to the antenna structure, said feed element being movable through an arc extending around part of the periphery of said circular region whereby the directivity pattern of the antenna may be swung through an angle corresponding to said arc by movement of said feed element.

(References on following page)

References Cited in the file of this patent

UNITED STATES PATENTS

| | | |
|---|---|---|
| 2,416,698 | King | Mar. 4, 1947 |
| 2,433,924 | Riblet | Jan. 9, 1948 |
| 2,469,419 | Tawney | May 10, 1949 |
| 2,478,241 | Chu | Aug. 9, 1949 |
| 2,504,333 | Iams | Apr. 18, 1950 |
| 2,526,675 | Litchford | Oct. 10, 1950 |
| 2,562,277 | Kock | July 31, 1951 |
| 2,576,181 | Iams | Nov. 27, 1951 |
| 2,576,182 | Wilkinson, Jr. | Nov. 27, 1951 |
| 2,596,190 | Wiley | May 13, 1952 |
| 2,650,985 | Rust et al. | Sept. 1, 1953 |

FOREIGN PATENTS

| | | |
|---|---|---|
| 362,261 | Italy | Aug. 19, 1938 |
| 114,368 | Australia | Dec. 24, 1941 |
| 871,633 | France | May 2, 1942 |
| 891,949 | France | Mar. 23, 1944 |
| 599,600 | Great Britain | Mar. 16, 1948 |
| 603,449 | Great Britain | June 16, 1948 |
| 605,344 | Great Britain | July 21, 1948 |